United States Patent
Yam (10) Patent No.: US 8,441,515 B2
(45) Date of Patent: May 14, 2013

(54) METHOD AND APPARATUS FOR MINIMIZING ACOUSTIC ECHO IN VIDEO CONFERENCING

(75) Inventor: Eric Yam, San Diego, CA (US)

(73) Assignee: Sony Corporation, Minato-Ku, Tokyo (JP)

(*) Notice: Subject to any disclaimer, the term of this patent is extended or adjusted under 35 U.S.C. 154(b) by 664 days.

(21) Appl. No.: 12/643,531

(22) Filed: Dec. 21, 2009

(65) Prior Publication Data

US 2011/0063405 A1   Mar. 17, 2011

Related U.S. Application Data

(60) Provisional application No. 61/243,319, filed on Sep. 17, 2009.

(51) Int. Cl.
- *H04N 7/14* (2006.01)
- *H04M 9/08* (2006.01)
- *H04B 3/23* (2006.01)
- *G06F 15/16* (2006.01)

(52) U.S. Cl.
USPC ............ 348/14.08; 345/173; 348/14.12; 348/14.16; 348/36; 379/202.01; 379/406.01; 379/406.03; 379/406.08; 379/406.14; 381/71.12; 381/92; 381/361; 382/103; 382/154; 455/556.1; 600/447; 708/322; 709/203

(58) Field of Classification Search ........... 348/14.08, 348/14.12, 14.16, 36; 379/406.01, 406.08, 379/406.14, 202.01, 406.03; 381/92, 361, 381/71.12; 708/322; 709/203; 345/173; 382/103, 154; 600/447; 455/556.1
See application file for complete search history.

(56) References Cited

U.S. PATENT DOCUMENTS

| | | | | |
|---|---|---|---|---|
| 5,418,848 A * | 5/1995 | Armbruster | ............. | 379/406.08 |
| 6,038,328 A * | 3/2000 | Hsu | ............... | 381/361 |
| 6,208,373 B1 * | 3/2001 | Fong et al. | ............. | 348/14.16 |
| 6,389,440 B1 * | 5/2002 | Lewis et al. | ............. | 708/322 |
| 6,483,532 B1 | 11/2002 | Girod | | |
| 6,618,481 B1 * | 9/2003 | Schmidt | ............. | 379/406.14 |
| 6,836,286 B1 * | 12/2004 | Tachi et al. | ............. | 348/36 |
| 6,850,265 B1 | 2/2005 | Strubbe et al. | | |
| 7,126,627 B1 * | 10/2006 | Lewis et al. | ............. | 348/14.16 |
| 7,190,775 B2 * | 3/2007 | Rambo | ............. | 379/202.01 |
| RE40,054 E * | 2/2008 | Girod | ............. | 348/14.12 |
| 7,536,030 B2 * | 5/2009 | Wang et al. | ............. | 382/103 |
| 7,570,803 B2 * | 8/2009 | Criminisi et al. | ............. | 382/154 |
| 7,634,533 B2 * | 12/2009 | Rudolph et al. | ............. | 709/203 |
| 7,680,285 B2 * | 3/2010 | Ballantyne et al. | ............. | 381/71.12 |
| 7,758,508 B1 * | 7/2010 | Thiele et al. | ............. | 600/447 |
| 8,189,807 B2 * | 5/2012 | Cutler | ............. | 381/92 |

(Continued)

FOREIGN PATENT DOCUMENTS

| | | |
|---|---|---|
| JP | 08-331019 | 12/1996 |
| JP | 11-331827 | 11/1999 |

(Continued)

*Primary Examiner* — Gerald Gauthier
(74) *Attorney, Agent, or Firm* — Moser Taboada (57) ABSTRACT

Embodiments of the present disclosure generally include a method and apparatus for minimizing acoustic echo in video conference. In one embodiment, a computer implemented method for minimizing acoustic echo in video conferencing comprises determining position information wherein the position information is derivable from a video stream and processing the position information using a computer to identify at least one direction wherein the one direction minimizes acoustic echo.

20 Claims, 6 Drawing Sheets

U.S. PATENT DOCUMENTS

| | | | |
|---|---|---|---|
| 2005/0213747 A1* | 9/2005 | Popovich et al. | 379/406.03 |
| 2006/0062380 A1* | 3/2006 | Kim et al. | 379/406.01 |
| 2006/0224382 A1 | 10/2006 | Taneda | |
| 2006/0244734 A1* | 11/2006 | Hill et al. | 345/173 |
| 2007/0189508 A1 | 8/2007 | Knutson et al. | |
| 2008/0304653 A1 | 12/2008 | Ghani et al. | |
| 2010/0062802 A1* | 3/2010 | Amram | 455/556.1 |
| 2010/0165071 A1* | 7/2010 | Ishibashi et al. | 348/14.08 |
| 2011/0063405 A1* | 3/2011 | Yam | 348/14.08 |
| 2011/0193935 A1* | 8/2011 | Gorzynski | 348/14.08 |

FOREIGN PATENT DOCUMENTS

| | | |
|---|---|---|
| JP | 2007-228070 | 9/2007 |
| JP | 2008-141734 | 6/2008 |
| WO | WO 2008/142979 A1 | 11/2008 |

* cited by examiner

METHOD AND APPARATUS FOR MINIMIZING ACOUSTIC ECHO IN VIDEO CONFERENCING

CROSS-REFERENCE TO RELATED APPLICATIONS

This application claims priority to U.S. Provisional Patent Application Ser. No. 61/243,319 filed Sep. 17, 2009 and incorporated herein by reference in its entirety.

BACKGROUND

1. Field of the Invention

Embodiments of the present invention generally relate to video conferencing and, more particularly, to a method and apparatus for minimizing acoustic echo in video conferencing.

2. Description of the Related Art

Video conferencing utilizes cameras and microphones in conjunction with display screens and speakers to display an audio and/or video stream captured at one geographical location at a second geographical location in real time. Typically, video conferencing provides collaboration between users situated at remote locations, by providing a real-time sound and image of a user at one location to other users at different locations. For example, video conferencing may be used to provide a real time business conference environment to users present at remote locations. As another example, a team of surgeons located on different cities may observe a patient's condition, interact or consult among themselves, and provide a combined diagnosis without the need to be physically present. As yet another example, an interactive classroom may be set up via video conferencing, with a teacher and several students interacting from different geographical locations.

Acoustic echo is a common phenomenon responsible for degradation of voice quality in current video conferencing systems. Usually, the video conferencing microphone(s) pick up echo from surrounding objects or video conferencing users, leading to echo. In other cases, the microphone receives the sound from the video conferencing speakers, which may also cause echo. In general, voice echo deteriorates the video conferencing experience significantly.

Accordingly, there exists a need for video conferencing systems and methods that provide improved acoustic echo cancellation in video conferencing systems.

SUMMARY OF THE INVENTION

Embodiments of the present disclosure generally include a method and apparatus for minimizing acoustic echo in video conferencing. In one embodiment, a computer implemented method for minimizing acoustic echo in video conferencing comprises determining position information wherein the position information is derivable from a video stream and processing the position information using a computer to identify at least one direction wherein the one direction minimizes acoustic echo.

In one embodiment, a system for minimizing acoustic echo in video conferencing comprises a camera configured to monitor position of at least one user wherein the at least one user is participant of the video conferencing and a microphone and speaker control module configured to project an audio beam in at least one direction, wherein the at least one direction is determined based on the position of the at least one user.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
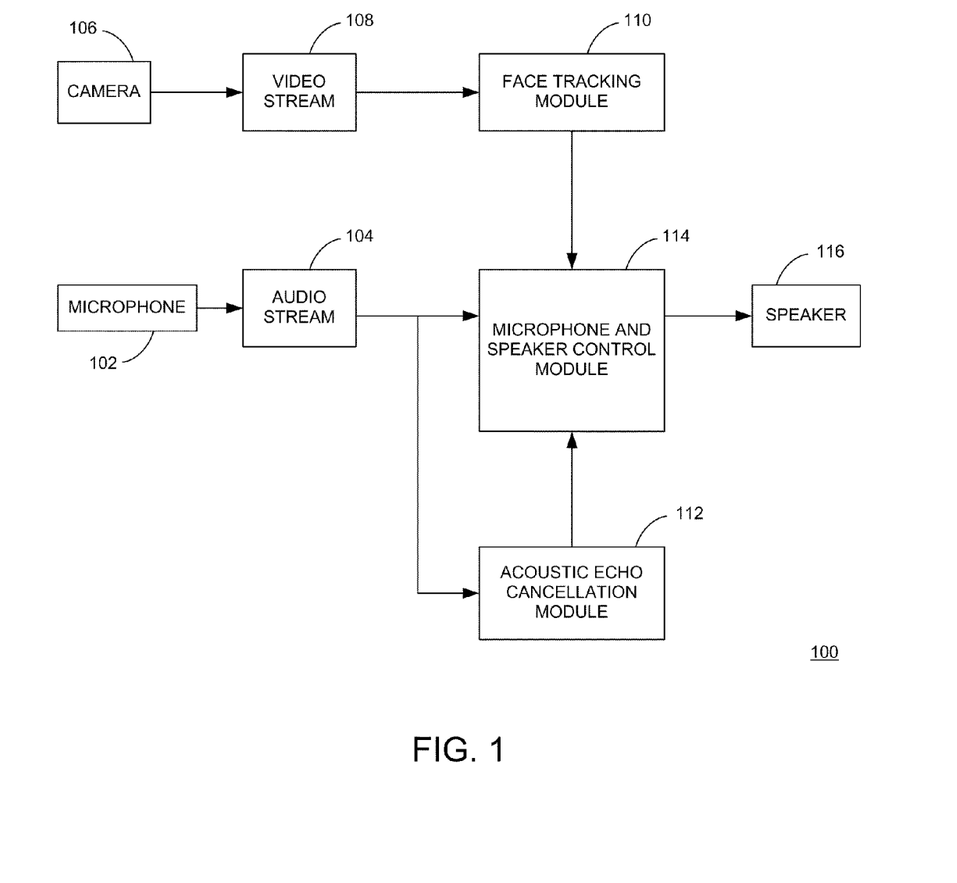
FIG. 1 is a schematic diagram of an apparatus for minimizing acoustic echo in video conferencing, according to an embodiment of the present invention.

FIG. 1 is a schematic diagram of an apparatus 100 for minimizing acoustic echo in video conferencing according to an embodiment of the present invention. The apparatus 100 includes a microphone 102 that provides an audio stream 104, a camera 106 that provides a video stream 108, a face tracking module 110, an acoustic echo cancellation module 112, microphone and speaker control module 114 and a speaker 116.

In one embodiment, the microphone 102 is a type of input device as generally known in the art that captures the audio stream 104. The microphone 102 is configured to provide the audio stream 104 for further processing to one or more modules, such as the acoustic echo cancellation module 112 and/or the microphone and speaker control module 114. In one embodiment, the microphone 102 is a beam-forming microphone. Beam-forming microphones are capable of creating an audio beam such that sound created outside the audio beam is not picked up by the microphone 102. In some embodiments, the microphone 102 may direct the audio beam via internal hardware. In other embodiments, the microphone 102 may be mounted on the camera 106 and the audio beam may be directed as the camera moves. The operation of the beam-forming microphones is discussed further with respect to FIG. 4. For example, one or more users may participate in a video conference. As such, the one or more microphones 102 may be utilized to capture one or more audio streams 104 representing the voices of the conference participants. The one or more audio streams 104 are then processed and sent to the microphone and speaker control module 114 for transmission to other conference participants (not shown). In one embodiment, the audio steam 104 is processed by the acoustic echo cancellation module 112 to minimize acoustic echo as described further below in the present disclosure.

Further, as the one or more users participate in the video conference, the camera 106 provides the video stream 108. In one embodiment, the camera is an optical capture device as generally known in the art. In one embodiment, the video stream 108 is a High Definition (HD) video stream. In addition to the captured video data, in one embodiment the video stream 108 may further comprise information indicating the orientation of the camera 106 for the determination of position information. In some embodiments, the camera 106 comprises one or more motors for directing the video stream to a particular position. In other embodiments, the camera 106 is mounted on a device for directing the video stream, such as a hand-positioned tripod, remote controlled mount, or the like.

The video stream 108 is processed to derive the position information. In some embodiments, the position information is derived relative to the position of the camera 106. The position of the camera 106 may be determined from input from a mounting device, motors built into the camera itself, or another source. In one embodiment, the position information is associated with a position of one or more users that are participants in the video conference. In other embodiments, the position information may be associated with the positions of other sound sources, such as televisions, radios, computers, natural phenomena, machinery, and the like. In one embodiment, the position information comprises the position of the sound sources. In one specific, non-limiting embodiment, the position information is associated with the face of the one or more users. As such, in one specific embodiment, the camera 106 is configured to monitor and/or track movement of the one or more users to follow the position of the face as discussed further below.

According to various embodiments, the face tracking module 110 includes software code (e.g., processor executable instructions) configured to process the video stream 108. The face tracking module 110 processes the video stream 108 to determine the position information. The face tracking module 110 is further configured to identify one or more face of the one or more user from the position information. The face tracking module 110 detects the face of the speaker within a sequence of video frames provided by the video stream 108. In one embodiment, the face tracking module 110 uses a face tracking algorithm such as the Viola-Jones object tracking framework, the Schneiderman and Kanade method, the Rowley, Baluja, and Kanade Neural Network method, or the like to identify facial features within the video frame. Once the face is identified, the face tracking module 110 monitors the position of the face as described further below in the present disclosure. However, it is appreciated here that one skilled in the art will readily identify other ways of face tracking and monitoring. In one embodiment, the face tracking module 110 may be implemented as, including but not limiting to, a hardware device such as chip embedded with logic (e.g., software code). The face tracking module 110 provides face locations to the microphone and speaker control module 114 for the direction of the microphone 102, and speakers 116 to the sound source. In one embodiment, the face tracking module 110 may direct the camera 106 to focus on and orient toward the determined location of the user's face.

The acoustic echo cancellation module 112 includes software code (e.g., processor executable instructions) configured to process the audio stream 104 to reduce noise. The acoustic echo cancellation module 112 samples the audio stream 104 to limit the acoustic echo within the audio stream 104. The acoustic echo cancellation module 112 utilizes adaptive filtering to limit the acoustic echo. In one embodiment, the acoustic echo cancellation module 112 limits an echo generated while performing the video conference. Further, as the one or more microphones 102 are utilized to capture the audio stream 104, one or more audio streams 104 are generated. As such, the acoustic echo cancellation module 112 processes the one or more audio streams 104. In one embodiment, the acoustic echo cancellation module 112 may extract a single audio stream 104 from the multiple audio streams 104 to sample and/or process for acoustic echo cancellation.

The microphone and speaker control module 114 includes software code (e.g., processor executable instructions) configured to monitor and control the microphone 102 and the speaker 116. In some embodiments, the speaker 116 includes hardware to direct an audio beam in a particular direction. The process of directing audio beams is discussed further with respect to FIG. 4. The microphone and speaker control module 114 adjust and/or modify the direction of audio beams produced by the microphone 102 and/or the speaker 116 in accordance to the direction of the face of the user. In one embodiment, the microphone and speaker control module 114 processes the face position information received from the face tracking module to determine one or more directions to receive input from the microphone 102 and project the output of the speakers 116. The microphone and speaker control module 114 directs the microphone 102 and speakers 116 to project an audio beam in the determined direction.

Figure 2:
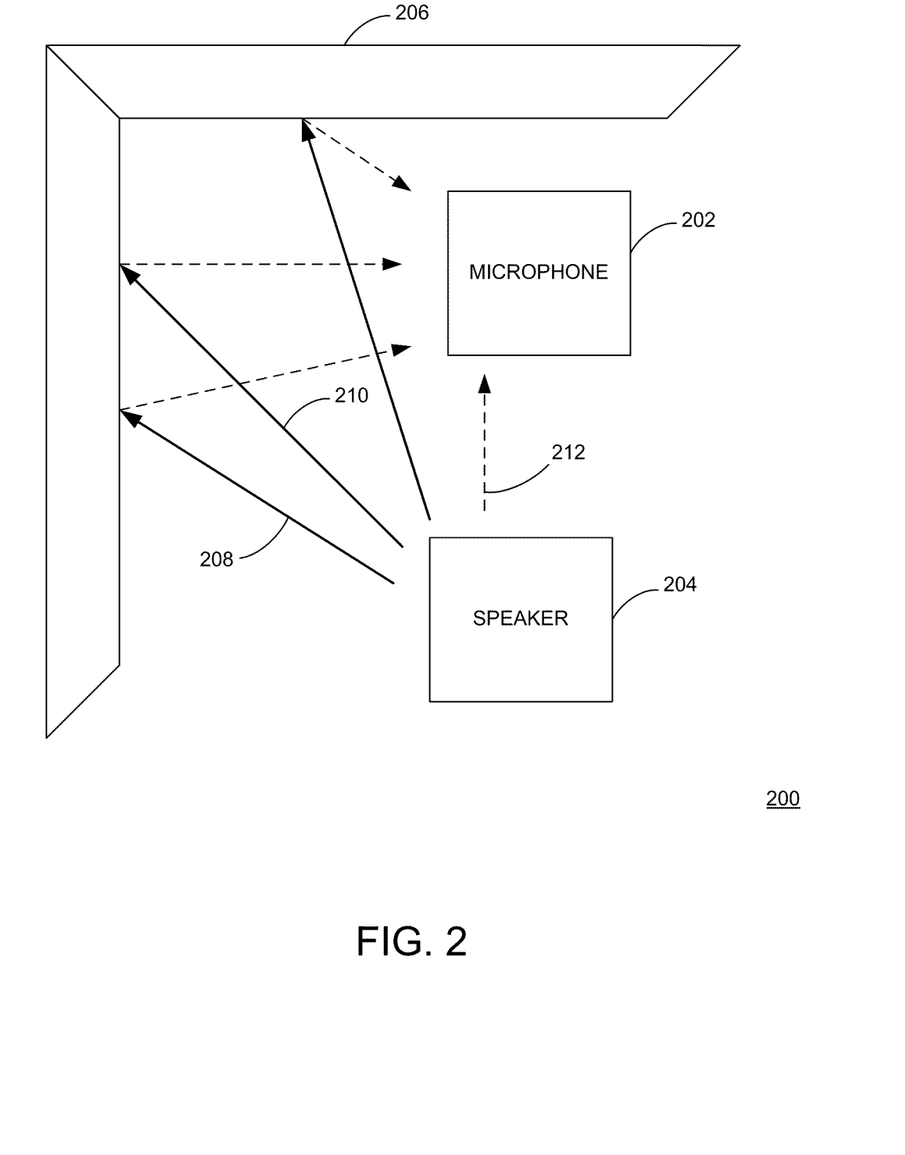
FIG. 2 is a schematic diagram that depicts minimizing acoustic echo in video conferencing, according to an embodiment of the present invention.

FIG. 2 is a schematic diagram that depicts minimizing acoustic echo in video conferencing according to an embodiment of the present invention. A microphone 202 and a speaker 204 may be surrounded by one or more walls 206.

According to various embodiments, the microphone 202 is utilized by one or more user to provide an audio stream. As the one or more users participate in the video conference, the microphone 202 and the speaker 204 are utilized simultaneously. The one or more user may utilize the microphone 202 to capture the audio stream while the speaker 204 may project an audio beam.

The speaker 204 is a type of an audio device that provides projection of the audio beam. As such, the audio beam may be reflected by one or more walls 206 as well as other objects such as a table, a chair, other users and/or the like in the proximity to the speaker 204 and may be captured by the microphone 202. As a result, acoustic echo may be generated when the projected audio beam is coupled back to the microphone 202 via direct or indirect paths, such as depicted by an arrow 208, 210, 212. As sounds produced by the speaker re-enter the microphone, the user at the receiving end of the audio stream may hear his/her own voice at a slight delay, making communication difficult. Therefore, adaptive filtering is utilized to cancel and/or limit the acoustic echo.

In one embodiment, an acoustic echo cancellation module (e.g., the acoustic echo cancellation module 112 of FIG. 1) is utilized to cancel the acoustic echo. The acoustic echo cancellation module utilizes adaptive filtering to cancel the acoustic echo. Further, the acoustic echo cancellation module facilitates cancellation of echo for variable tail lengths. The acoustic echo cancellation module processes the audio stream to cancel distractions caused by slight audio delays. Such acoustic echo cancellation module provides a full duplex channel that facilitates users on both ends to communicate with each other through the video conference.

Figure 3:
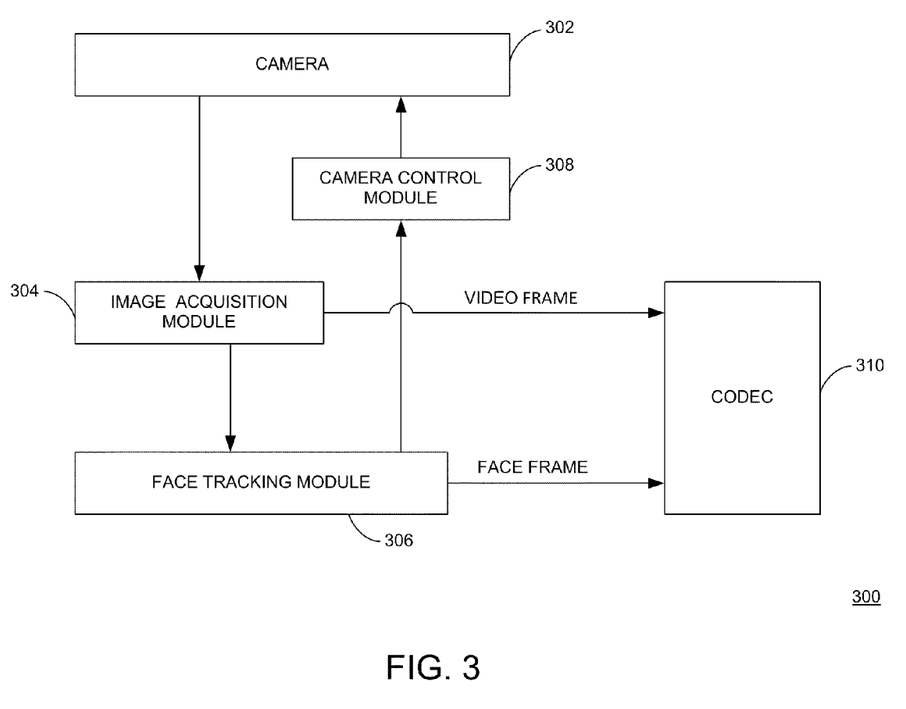
FIG. 3 is a block diagram of a system for monitoring the face of a user, according to an embodiment of the present invention.

FIG. 3 is a block diagram of a system 300 for monitoring face of a user according to an embodiment of the present invention. The system 300 includes a camera 302, an image acquisition module 304, a face tracking module 306, a camera control module 308 and a codec 310.

The camera 302 is a type of an optical device (e.g., a video camera and/or the like) that is configured to provide a video stream. Generally, the video stream comprises sequence of one or more frames. In one embodiment, the one or more cameras 302 may be utilized by one or more users while performing a video conference. As such, the one or more cameras 302 continuously provide the video stream during the video conference. The camera communicates the video stream to the image acquisition module 304 for further analysis as described below.

In one embodiment, the image acquisition module 304 processes the video stream. The image acquisition module 304 is configured to communicate one or more frames to the codec 310. In another embodiment, the image acquisition module 304 is configured to communicate the one or more frames to the face tracking module 306 for further analysis.

The face tracking module 306 includes software code (e.g., processor executable instruction) that is configured to determine the position of one or more faces within the video steam in the manner discussed with respect to the face tracking module 110 of FIG. 1. In one embodiment, the face tracking module 306 determines and/or identifies one or more faces within the each one or more frames of the video stream 108 received from the camera 302. The face tracking module 306 identifies a face profile to determine the one or more face. The face tracking module 306 may draw a rectangular frame around the identified face to determine the coordinates of the face, thus determining the position of the user associated with the face. The position data facilitates the tracking of the face of the user, such as their position within the room. However, other ways of face tracking and monitoring will be readily apparent to one skilled in the art. As the position of the user's face changes, the camera 302 can be directed to follow the user throughout the room. Such face tracking allows the user to move around in the room. Once the face is determined within the sequence of the frames, the face tracking module 306 communicates the one or more frames associated with the one or more face to the camera control module 308. Further, the one or more frames associated with the face are communicated to the codec 310.

The camera control module 308 is configured to control the camera 302. In one embodiment, the camera control module 308 is configured to adjust a position of the camera 302 such that the camera 302 tracks the user. The camera control module 308 provides a feedback (e.g., frames associated with one or more face) to the camera 302 such that the camera 302 tracks the one or more users associated with the identified face. As a result, the video stream provided by the camera 302 subsequent to the feedback includes tracking (e.g., movement with in the room, change in position and/or the like) of the one or more users associated with the one or more identified faces.

According to one embodiment, the codec 310 includes software code (e.g., processor executable instructions) that is configured to transform one or more frames into a suitable representation for transmission, such as a binary representation. In one embodiment, the codec 310 transforms the sequence of frames and/or one or more frames that include the one or more face into the binary representation. Further, the codec 310 is configured to transform the binary representation of one or more sequence of frames and/or one or more frames that include the one or more face into a suitable representation such as an image frame.

Figure 4:
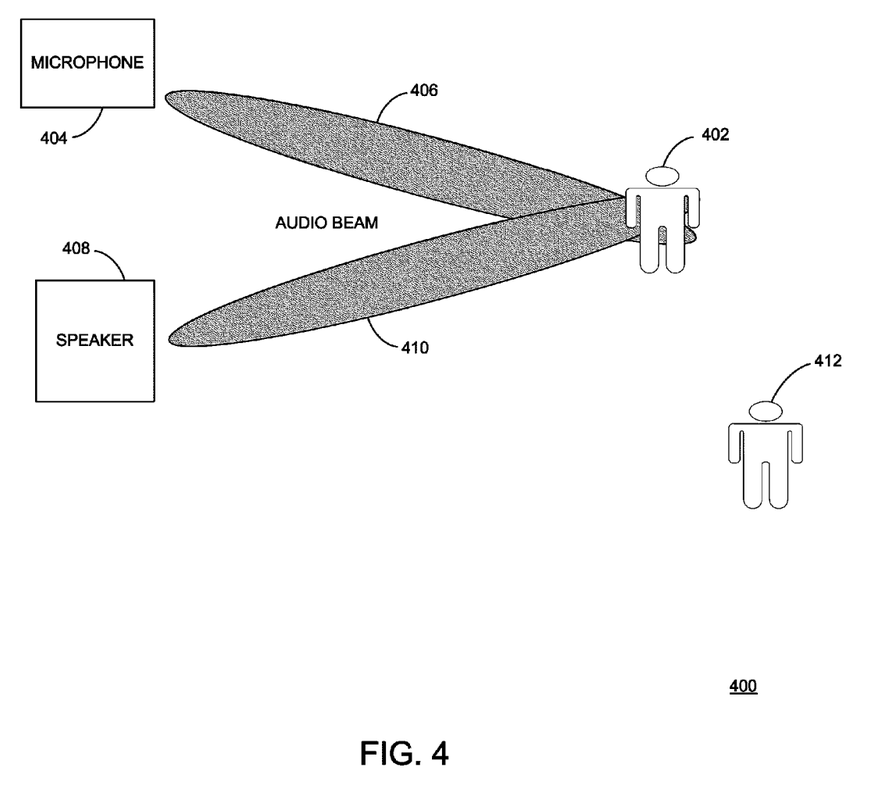
FIG. 4 is a schematic diagram that depicts directional beam forming audio, according to an embodiment of the present invention.

FIG. 4 is a schematic diagram that depicts directional beam forming audio according to one embodiment of the present invention.

One or more users 402 may utilize a directional beam-forming microphone 404 in order to participate in a video conference. As the one or more users 402 participate in the video conference, the directional beam-forming microphone 404 captures an audio stream provided by the one or more users 402. The directional beam-forming microphone 404 generates an audio beam between itself and the users 402. Only sound produced within the beam is received by the microphone. This reduces receipt of "unintended" sound by the directional beam-forming microphone 404, such as noise generated from echoes. Further, a camera is utilized to provide a video stream that includes position information. The position information is processed to determine the position of the one or more users 402 participating in the video conference.

The audio beam 406 is directed in one or more directions depending on a number of microphones utilized to perform the video conference. For example, the one or more users 402 may utilize a single microphone 404 to provide the audio stream simultaneously. As such, each user would need to be within the beam 406 generated by the directional beam-forming microphone 404. If two microphones are used, each user would be enclosed within a separate beam from a separate microphone. The audio beam 406 may be directed in one or more directions. Once the direction of the audio beam 406 is identified, a directional audio beam 410 may be directed by a directional beam-forming speaker 408 in the same one or more directions as discussed further below.

The directional beam-forming speaker 408 also provides projection of an audio beam. Once the direction of the user is identified, the directional beam-forming speaker 408 may be utilized to project the directional audio beam 410 in the same direction. For example, if the face tracking module 110 determines that the user's face is in a "North" direction, the audio beam from the beam-forming speaker may also be directed in the "North" direction. Such directional projection of the audio beam 410 facilitates cancellation of acoustic echo by projecting audio away from the directional beam-forming microphone. Further, only the one or more users 402 within the directional audio beam 410 are able to receive the audio projection while other users 412 are unable to receive the audio projection and hence audio is not audible to the other users 412.

Figure 5:
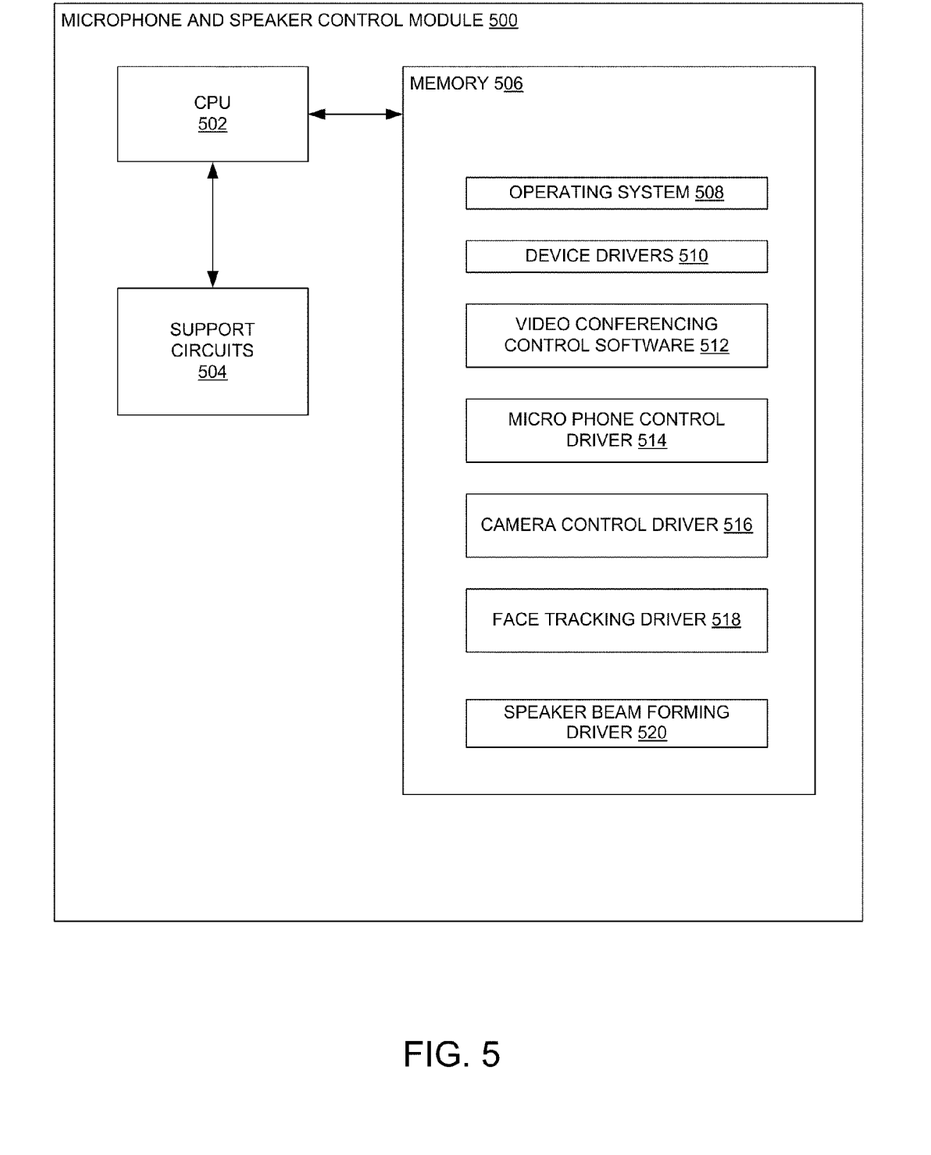
FIG. 5 is a block diagram of microphone and speaker control module for performing video conferencing, according to an embodiment of the present invention.

FIG. 5 is a block diagram of a microphone and speaker control module 500 for minimizing acoustic in echo video conferencing according to one embodiment of the present invention. The microphone and speaker control 500 is a type of computing device (e.g., a laptop, a desktop, a Personal Digital Assistant (PDA), a video conference control system, and/or the like) that comprises a Central Processing Unit (CPU) 502, various support circuits 504 and a memory 506. The CPU 502 may comprise one or more commercially available microprocessors or microcontrollers that facilitate data processing and storage. Various support circuits 504 facilitate operation of the CPU 502 and may include clock circuits, buses, power supplies, input/output circuits and/or the like. The memory 506 includes a read only memory, random access memory, disk drive storage, optical storage, removable storage, and the like. The memory 506 may include an operating system 508, device drivers 510 as well as various data and software packages, such as video conferencing control software 512, a microphone control driver 514, a camera control driver 516, a face tracking driver 518 and a speaker beam forming driver 520.

The operating system 508 generally manages various computer resources (e.g., network resources, data storage resources, file system resources and/or the like). The operating system 508 is configured to execute operations on one or more hardware and/or software devices, such as Network Interface Cards (NICs), hard disks, virtualization layers, firewalls and/or the like. For example, the various software packages call commands associated with the operating system 508 (i.e., native operating system commands) to perform various file system and/or storage operations, such as creating files or metadata, writing data to the files, reading data from the files, modifying metadata associated with the files and/or the like. The operating system 508 may call one or more functions associated with the device drivers 510 to execute various file system and/or storage operations. As an example, the operating system 508 may utilize a device driver associated with a Network Interface Card (NIC) card to communicate data to another device such as a camera explained further below.

According to one embodiment, the video conferencing control software 512 includes software code (e.g., processor executable instructions) that when executed by the CPU 502 causes the video conferencing control software 512 to initiate a video conference. The video conferencing control software 512 cooperates with various drivers, such as the microphone control driver 514, the camera control driver 516, face tracking driver 518, speaker beam forming driver 520, to facilitate the video conference.

In one embodiment, the microphone control driver 514 includes software code (e.g., processor executable instructions) that is configured to monitor one or more microphone (e.g., the microphone 202 of FIG. 2). In one embodiment, the microphone control driver 514 is executed by the CPU 502 to capture and/or process an audio stream. The microphone control driver 514 is further configured to cooperate with the camera control driver 516 to identify one or more directions in which the one or more users are positioned, as discussed further below. Once the one or more directions are identified in which the one or more users are positioned, the microphone control driver 514 adjusts the microphone 102 to point in the same one or more direction, thereby forming an audio beam.

In one embodiment, the camera control driver 516 includes software code (e.g., processor executable instructions) that is configured to provide a video stream. The video stream includes position information associated with the one or more users. In one embodiment, the camera control driver 516 adjusts the direction of a camera 106 to capture the one or more users. For example, the user participating in the video conference may not be stationary and hence, may change position from one place to another. Further, the camera control driver 516 cooperates with the face tracking driver 518 to adjust the position of the camera to face in the same direction of the moving one or more user.

In one embodiment, the face tracking driver 518 includes software code (e.g., processor executable instructions) that when executed by the CPU 502 processes the position information with in the video stream. The face tracking module 518 is configured to derive the position information from the video stream. The face tracking driver 518 processes the position information to track position associated with the one or more users that are participating in the video conference. In one embodiment, the face tracking driver 518 uses a face tracking algorithm such as the Viola-Jones object tracking framework, the Schneiderman and Kanade method, the Rowley, Baluja, and Kanade Neural Network method, or the like to identify facial features within the video frame. The face tracking driver 518 identifies the faces of the one or more users within the video stream and provides directional information to the microphone control driver 514, the camera control driver 516, and the speaker beam forming driver 520. The microphone control driver 514 the camera control driver 516, and the speaker beam forming driver 520 may utilize such information to adjust position such that the camera, microphone, and/or speakers are pointing in the same direction of the user. Such feedback facilitates the audio beam formation.

In one embodiment, the speaker beam forming driver 520 includes software code (e.g., processor executable instructions) that is configured to project a directional audio beam in the determined direction of the face of a user. The directional projection of the audio beam minimizes acoustic echo by directing an audio beam-forming speaker in the determined direction. Such directional projection of the audio beam forming speaker provides the audio beam projection only to users who are positioned on the audio beam and minimizes the amount of echo that is picked up by the microphone.

Figure 6:
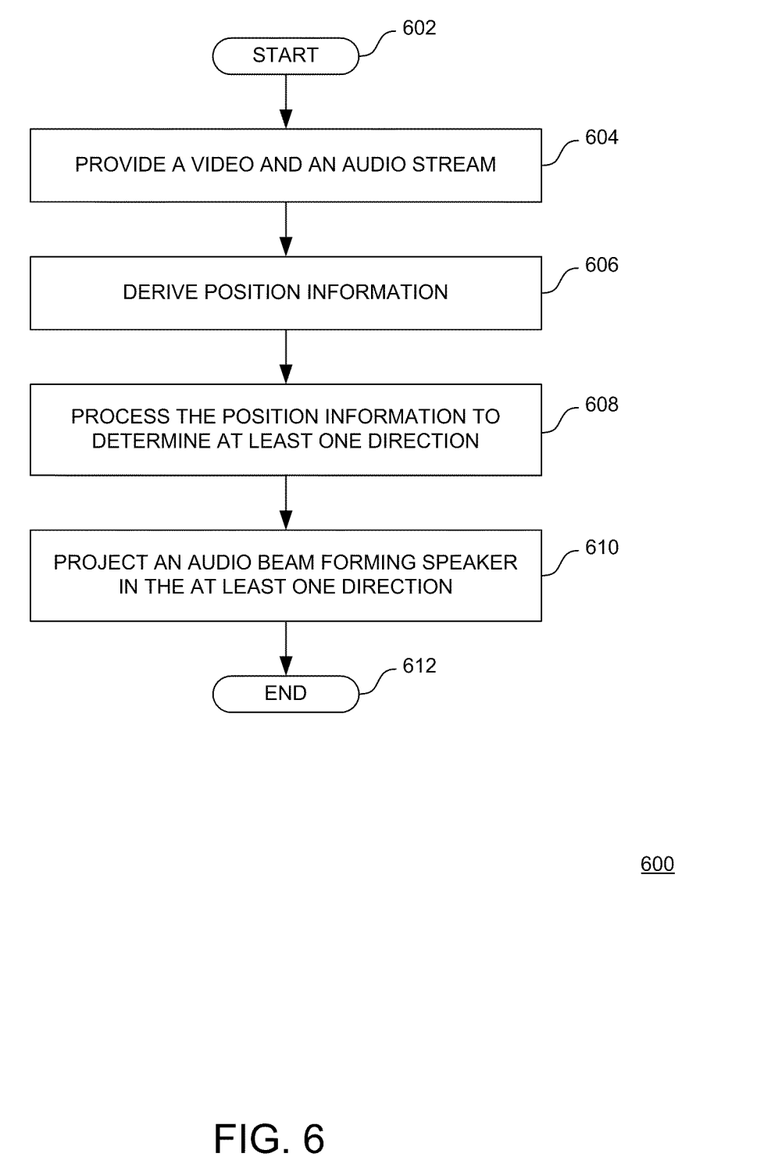
FIG. 6 is a flow diagram of a method for minimizing acoustic echo in video conferencing, according to an embodiment of the present invention.

FIG. 6 is a flow diagram of a method 600 for minimizing acoustic echo in video conferencing according to one embodiment of the present invention. The method 600 starts at step 602 and proceeds to step 604, at which a video and an audio stream is provided. The video stream is provided by an optical device, such as a camera (e.g., the camera 106 of FIG. 1). The audio stream is provided (i.e. captured) by an input device, such as a microphone (e.g., the microphone 102 of FIG. 1). Further, the audio stream is processed by an acoustic echo cancellation module (e.g., the acoustic echo cancellation module 112 of FIG. 1) to limit acoustic echo. In one embodiment, the video stream includes position information.

At step 606, the position information is derived. The video stream is processed to derive the position information. In one embodiment, the position information includes tracking of one or more faces associated with one or more users participating in a video conference. A face tracking module (e.g., the face tracking module 110 of FIG. 1) is utilized to track the one or more faces associated with the one or more users.

At step 608, the position information is processed to determine at least one direction of the faces of the users. In one embodiment, the position information is processed to determine the one or more directions based on a position of the users, including but not limited to, within a room. Once the one or more directions are determined in which the user is positioned, the direction may be utilized to project a focused audio beam.

At step 610, a speaker is utilized to project the audio beam in the one or more determined directions. In one embodiment, a microphone and a speaker control module (e.g., the microphone and the speaker control module 114 of FIG. 1) modifies and/or monitors direction of the one or more microphones and/or the speakers such that the microphone and the speaker are in same direction as the user. In one embodiment, the speaker is an audio beam forming speaker that projects the focused audio beam. Such projection facilitates reduction in acoustic echo as well as improved audio reception. The method 600 proceeds to step 610, where the method 600 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A computer implemented method for minimizing acoustic echo in video conferencing, the method comprising:
   determining position information, wherein the position information is derivable from a video stream; and
   processing the position information using a computer to identify at least one direction wherein the one direction minimizes acoustic echo.

2. The method of claim 1, wherein determining the position information further comprises tracking the position of the face of at least one user.

3. The method of claim 1, further comprising directing an audio beam-forming microphone in the at least one direction.

4. The method of claim 1, further comprising directing an audio beam-forming speaker in the at least one direction.

5. The method of claim 1 further comprising processing the audio stream to limit noise.

6. The method of claim 5 further comprising adaptively filtering the audio stream to limit acoustic echo.

7. The method of claim 5 further comprising generating the audio beam based on sampling the audio stream.

8. The method of claim 4, wherein directing the audio beam-forming speaker further comprises projecting a directional audio beam from the speaker to a particular location.

9. A system for minimizing acoustic echo in video conferencing, the system comprising:
   a camera configured to monitor position of at least one user, wherein the at least one user is participant of the video conferencing; and
   a microphone and speaker control module configured to direct an audio beam in at least one direction, wherein the at least one direction is determined based on the position of the at least one user.

10. The system of claim 9, wherein the camera is further configured to generate position information associated with the at least one user.

11. The system of claim 9, wherein the camera is further configured to track the position of the face of the at least one user.

12. The system of claim 11, wherein the microphone and speaker control module further comprises processing the position information to determine the at least one direction.

13. The system of claim 11, wherein the microphone and speaker control module further comprises directing an audio beam-forming microphone in the at least one direction.

14. The system of claim 11, wherein the microphone and speaker control module further comprises directing an audio beam-forming speaker in the at least one direction.

15. The system of claim 14, wherein the microphone and speaker control module further comprises directing the audio beam-forming speaker further comprises projecting a directional audio beam.

16. The system of claim 9, wherein the microphone and speaker control module further comprises processing an audio stream to limit noise.

17. The system of claim 16 further comprises adaptively filtering the audio stream to limit acoustic echo.

18. The system of claim 16 further comprising generating the audio beam based on sampling the audio stream.

19. A computer implemented method for minimizing acoustic echo in video conferencing, the method comprising:
   determining the position of a face of a user using a computer, wherein the position information is derivable from a video stream produced by a video camera;
   processing the position information using a computer to identify at least one direction wherein the one direction minimizes acoustic echo;
   directing an audio beam-forming microphone in the at least one direction; and
   directing an audio beam-forming speaker in the at least one direction.

20. The method of claim 19, further comprising directing the video camera to center on the face of the user.

* * * * *